United States Patent [19]

Wise

[11] Patent Number: 4,897,687
[45] Date of Patent: Jan. 30, 1990

[54] ROLLED MICROFILM PRINTING SYSTEM AND METHOD

[75] Inventor: David S. Wise, Solon, Ohio

[73] Assignee: Tameran, Inc., Chagrin Falls, Ohio

[21] Appl. No.: 179,492

[22] Filed: Apr. 8, 1988

[51] Int. Cl.[4] ....................... G03B 27/70; G03B 27/54
[52] U.S. Cl. ........................................ 355/43; 355/45; 355/64
[58] Field of Search ................. 355/5, 7, 41, 45, 71, 355/64, 43, 70, 65, 67; 353/26 A, 26 R

[56] References Cited

U.S. PATENT DOCUMENTS

| | | | |
|---|---|---|---|
| 3,765,758 | 10/1973 | Jackson et al. | 355/44 X |
| 4,116,560 | 9/1978 | Dragani et al. | 355/45 |
| 4,213,696 | 7/1982 | Wise | 355/41 |
| 4,739,368 | 4/1988 | Lachut et al. | 355/5 X |
| 4,745,489 | 5/1988 | Kashiwagi et al. | 355/41 X |
| 4,750,021 | 6/1988 | Holroyd et al. | 355/41 |

Primary Examiner—L. T. Hix
Assistant Examiner—D. Rutledge
Attorney, Agent, or Firm—Calfee, Halter & Griswold

[57] ABSTRACT

A roll microfilm printer and method includes preview optics sequentially to scan microfilm images for temporarily recording at least edge location and background density data and printing optics sequentially to print the microfilm images onto plain paper with masking and exposure control based upon the prerecorded data from the preview optics. The preview optics include a sensor board having an array of photo diode sensors to receive a light beam that sequentially passes through microfilm images contained on the moving microfilm strip, the optically sensed data from the images is electronically converted and temporarily recorded for use in subsequently controlling the printing optics. The printing optics includes a high speed mask assembly positioned adjacent the moving microfilm strip, the mask assembly having two high speed stepper motors controlled in accordance with the prerecorded data to drive edge masks toward or away from one another to mask unused image areas.

18 Claims, 4 Drawing Sheets

ROLLED MICROFILM PRINTING SYSTEM AND METHOD

FIELD OF THE INVENTION

The present invention relates as indicated to a roll microfilm printer and method in general and to a preview optics system used to control a subsequent printing optics system, in particular.

BACKGROUND OF THE INVENTION

The assignee of the present invention has marketed a roll microfilm printer under the model designation Autoprint 2000R for several years. This commercially successful roll microfilm printing system included some printing and synchronization controls.

In this regard, the Model 2000R roll microfilm printer drove the microfilm strip through an optics projection system. This optics projection system was mounted for selective movement in the x direction relative to the system console for optics magnification purposes. For synchronizing paper feed to the microfilm strip movement through the optics, three different techniques were used in the Model 2000R.

First, for microfilm strip having sprocket drive holes along one or both of its margins, an interrupter with two fingers thereon had the sprocketed marginal edge of the microfilm strip passing between the fingers. The interrupter had a light emitting diode on one finger and a photo transistor on the other finger to read the sprocket holes passing therebetween. If the microfilm strip path had to be adjusted for alignment with the paper feed path to center the copies on the paper, then the interrupter similarly had to be adjusted to maintain the sprocketed marginal edge between the fingers.

Second, if a synchronization blip or mark format was used for synchronizing the paper feed to the feed of the microfilm strip, an edge detector device was mounted far enough away from the movable projection system to have an optical cone image area large enough to encompass both the blip mark and the leading edge of the next succeeding microfilm image. The synchronization blip mark was being read slightly out of focus, and if the microfilm images being printed were large enough, the blip mark and leading image edge might not be included in the enlarged image area to preclude synchronization. If the microfilm strip had to be moved for alignment with the paper feed path, then the edge detection device similarly had to be adjusted for optical alignment with the image of the synchronization blip mark.

Third, if the synchronization was based upon the gutter channels between microfilm image frames, a row of fiber optics was mounted in the path of the light beam emanating from the adjustable projection system at a point sufficiently remote to allow the optical cone of the image area to be large enough to see not only the leading edge being printed but also the leading image of the image to be printed next. Again, the fiber optics were scanning the leading edge of the image subsequently to be printed slightly out of focus potentially resulting in a slight loss of synchronization and/or slight mistiming of shutter sequences to mask the gutter area between images. If the microfilm strip had to be moved slightly for alignment with the paper feed path, the fiber optics row potentially had to be adjusted for proper alignment with the optical cone encompassing the microfilm image being printed and the microfilm image to be printed.

The Model 2000R roll microfilm printer had manually adjusted masks for the top and bottom edges of the microfilm image. If the film strip had to be shifted to align the film path with the paper path for proper positioning of the copies on the paper, the edge mask also had to be manually adjusted to compensate for that movement. These masks were remotely positioned from the movable optic projection system, and thus the masking was being performed on an image slightly out of focus. No automatic control of these masking edges was provided by this system.

The present invention was developed to improve upon the features provided by the Model 2000R printer and to reduce the size of the unit by eliminating the need for a movable projection optics system.

SUMMARY OF THE INVENTION

The principal object of the present invention is to provide a roll microfilm printing system prescanning microfilm images a fixed distance in advance of printing to synchronize printing, to automatically mask unused image areas, to automatically control exposure and to automatically select paper size. The prescanning function is performed by a preview optics system including a sensor board coupled to a microprocessor for sensing and temporarily recording microfilm image data which can be subsequently used in the printing optics.

Another object of the present invention is to provide a roll microfilm printing system and method having preview optics to scan and temporarily record edge and density data for the microfilm images passing thereby and printing optics to print the microfilm images using the prerecorded data for automatic masking, synchronization and exposure control. The data sensed by the preview optics and temporarily recorded by the microprocessor is used to control edge masking, paper synchronization, shutter operation and exposure control.

Still another object of the present invention is to mount the roll microfilm drive and parts of the preview and printing optics on a vertical wall selectively adjustable in the Y direction relative to the system console containing the rest of the optics systems and the paper feed path. This wall can be adjusted to align the film path with the paper path to center the printed microfilm images onto the plain paper copies.

Yet another object of the present invention is to provide a roll microfilm printing system including a pilot screen for the printing optics in conjunction with a preview screen for the preview optics. The pilot screen provides a macroimage of the microfilm image in the printing optics. The macroimage can be used by the operator for focusing the printing optics and for alignment of the film path with the paper path. In addition, the pilot screen can be used in conjunction with the preview screen to program information into the microprocessor to synchronize the paper feed to the microfilm strip feed.

These and other objects and advantages of the present invention will become apparent as the following description proceeds.

The invention, then, comprises the features hereinafter fully described and particularly pointed out in the claims, the following description and annexed drawings setting forth in detail certain illustrative embodiments of the invention, these being indicative, however, of but a few of the various ways in which the principles of the invention may be embodied.

DETAILED DESCRIPTION OF THE DRAWINGS

DETAILED DESCRIPTION OF THE PREFERRED EMBODIMENT

Figure 1:
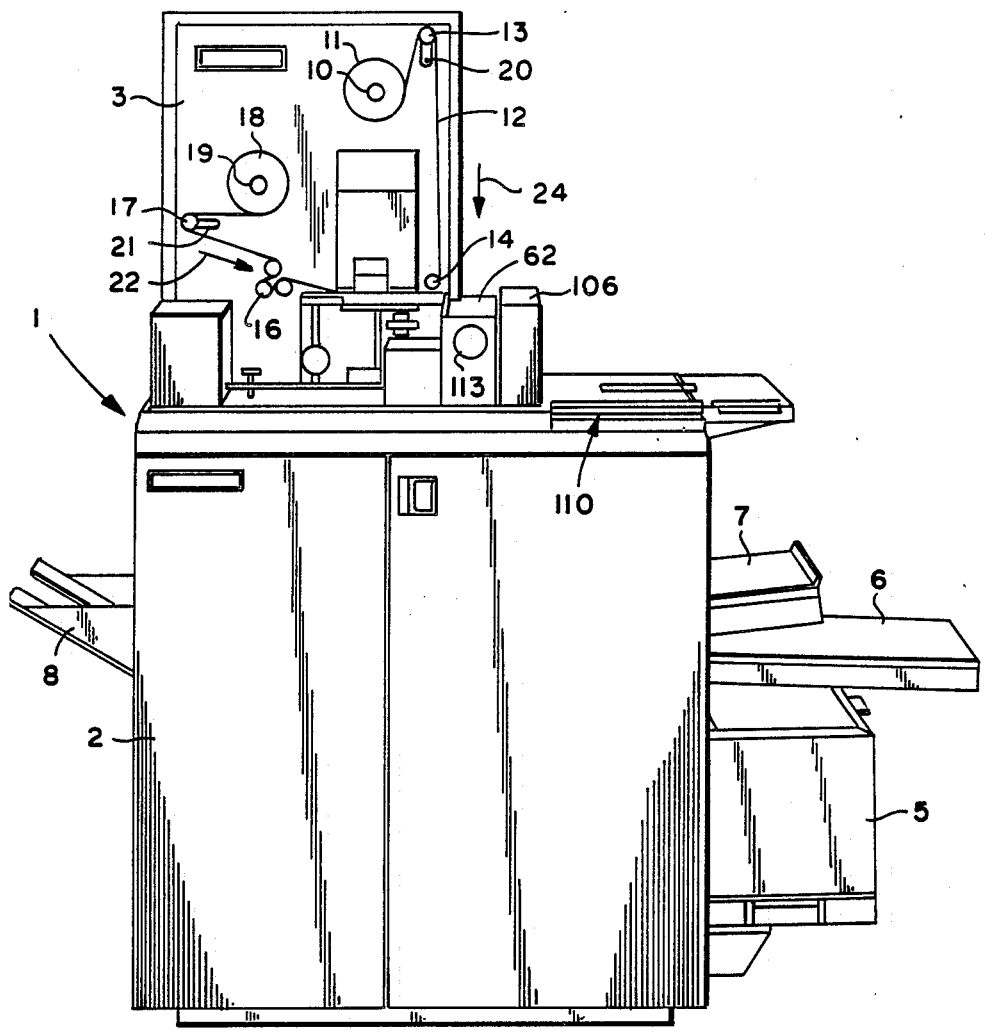
FIG. 1 is a front perspective of the roll microfilm printing system unit of the present invention.
Figure 2:
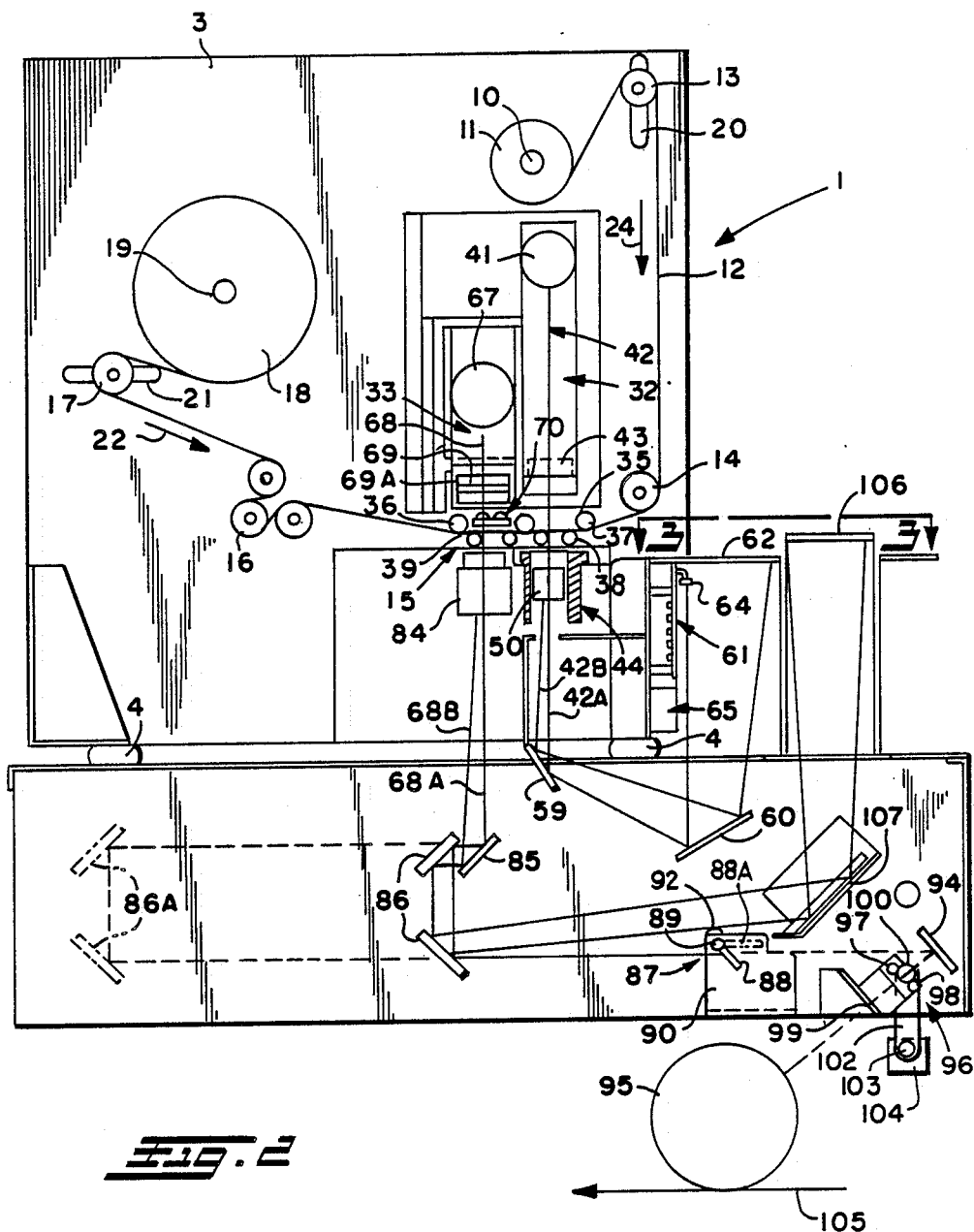
FIG. 2 is a vertical elevation of the roll microfilm printing system schematically illustrating the preview and printing optics employed in the present invention.

Referring now in more detail to the drawings and initially to FIGS. 1 and 2, the roll microfilm printing system unit, indicated generally at 1, includes a base console assembly 2 and a vertical wall 3. Wall 3 is selectively adjustable in the Y direction relative to the console 2 along parallel guides 4 mounted on the top of console 2.

The console 2 has side mounted selectively removable paper bins 5-7 for supplying paper feed stock of different sizes and orientations to the printing optics system of the unit. For example, main bin 5 may contain a stack of 8½×11 inch letter size paper, bin 6 may contain a stack of 8½×14 inch legal size paper and bin 7 may contain a stack of 8½×11 inch letter size paper oriented on its side. As described in more detail below, the system automatically feeds paper of the proper size through console 2 in synchronism with the feed rate of the microfilm images being printed to provide plain paper copies of the microfilm images. These plain paper copies are automatically delivered by the system to delivery bin 8. The quality of the print copy is enhanced by the preview and printing optics systems being closely coordinated with and interrelated to the microfilm feed and paper feed.

Relative to the microfilm strip feed, the wall 3 has a spindle 10 extending outwardly therefrom rotatably to mount a first reel 11 having a roll of microfilm strip wound thereon. The microfilm strip 12 is threaded around first tensioning roller 13 and directional roller 14, through gate assembly 15, around capstan drive roller 16 and second tensioning roller 17 to second reel 18. Second reel 18 is rotatably mounted on spindle 19 extending outwardly from wall 3.

The first and second tensioning rollers 13 and 17 are adjustable by the shafts therefor respectively being received in and movable along elongated slots 20 and 21 in wall 3. The capstan drive roller 16 drives the microfilm strip from the first reel to the second reel or vice versa. The tensioning rollers 13 and 17 are continuously and automatically adjusted during microfilm strip 12 feed to maintain the film strip at a constant, preselected tension during movement. The microfilm is originally supplied on second reel 18 and is initially driven in the direction indicated by arrow 22 to wind the microfilm on first reel 11. The microfilm strip 12 is then driven in the direction of arrow 24 from first reel 11 to second reel 18 for scanning and printing. By printing in reverse order, the printed copies in delivery bin 8 are properly sequentially collated.

Figure 3:
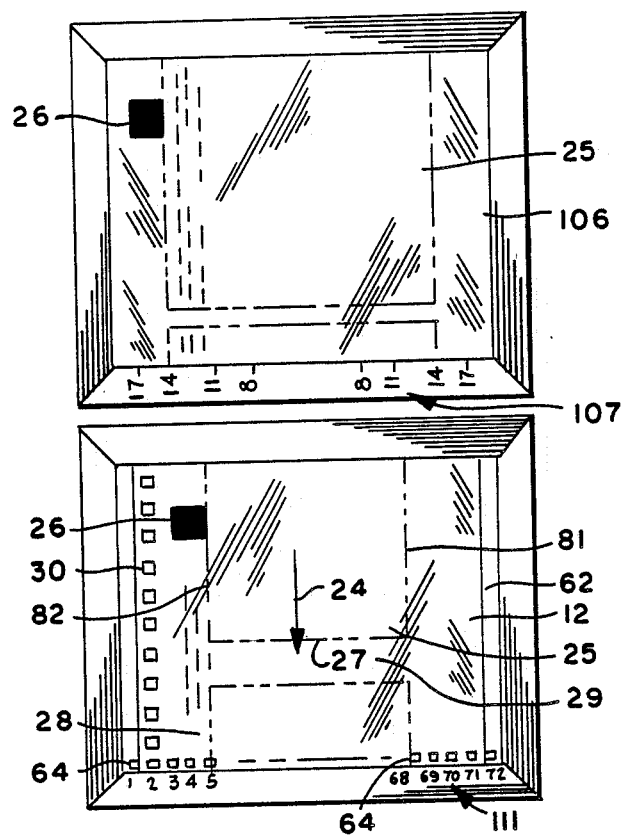
FIG. 3 is a plan view taken from the plane 3—3 in FIG. 2 showing the preview screen and pilot screen utilized to set up and program the preview and printing optics of the present invention.

Referring now to FIG. 3, the microfilm strip 12 has a plurality of images 25 contained thereon. The microfilm images can be of original hard copy documents or can be computer generated images based upon the computer data base. The microfilm images have black backgrounds and clear letters, characters or lines. The space between and around the microfilm images is normally clear film material. The microfilm strips have at least three different alternate formats for synchronizing the feed sequence of the microfilm strip to the feed sequence of the paper.

First, the microfilm images may have synchronization marks 26 extending outwardly from one side thereof. The synchronization mark 26 for each microfilm image 25 is spaced the same distance from the leading edge 27 of the next succeeding or upstream microfilm image. Second, the gutter channels 29 between images may be employed for synchronization by using the leading edge 27 of each microfilm image. Third, as shown in FIG. 3, sprocket holes 30 along one or both of the microfilm strip margins may be used for synchronization. The sprocket holes have a repeating pattern relative to the microfilm images, with there being the same number of sprockets between the leading edge 27 of one image and the leading edge of each adjacent microfilm image.

The microfilm strip utilizing any synchronization format is driven through preview optics, indicated generally at 32, and printing optics, indicated generally at 33. The microfilm strip 12 passes through the gate assembly 15 to flatten the strip for the preview and printing optics to enhance copy quality and control. The gate assembly 15 includes a first gate 35 at the preview optics and a second gate 36 at the printing optics. Each gate includes two spaced upper rollers 37 above strip 12 and two spaced lower rollers 38 below strip 12. The microfilm strip 12 is bent slightly as it passes between the nip 39 defined between each cooperating pair of upper roller 37 and lower roller 38. The respective centerlines of the preview optics and printing optics pass through the microfilm strip immediately adjacent microfilm strip bends, as illustrated in FIG. 2. By positioning the optics close to these bends, the microfilm strip is held in a flattened condition across its width at the optics to improve the optical imaging quality at the preview optics and printing optics.

The preview optics includes a first light source 41 emitting a first light beam traveling through the preview optics in a first light path, indicated generally at 42. The centerline of the first light beam of the preview optics is indicated at 42A, while the used portion of the optical cone of the first light beam is indicated at 42B. The first light beam 42 passes through a condensing lens 43 operative to focus the first light beam on the microfilm strip 12 in alignment therewith. Thereafter, the first light beam 42 passes through the microfilm strip and an objective lens assembly, indicated generally at 44.

Figure 5:
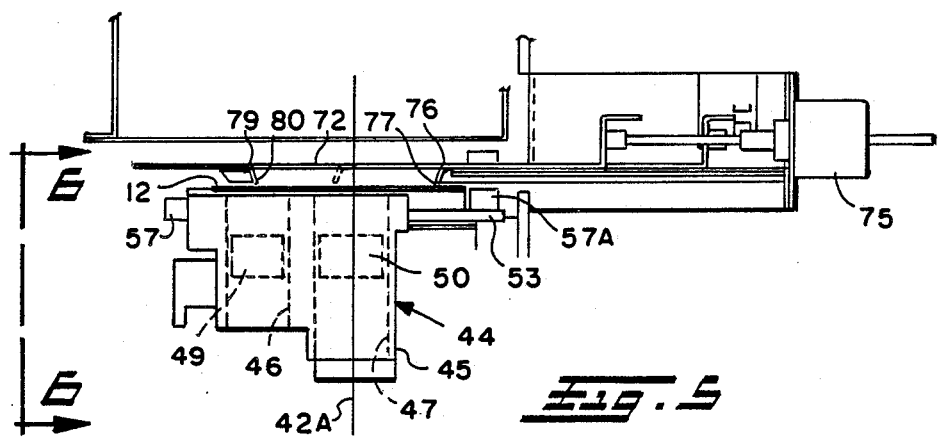
FIG. 5 is a vertical cross section taken along the plane 5—5 of FIG. 4 showing the shiftable objective lens assembly in the preview optics and the stepper motor drive of the edge mask assembly in the printing optics.
Figure 6:
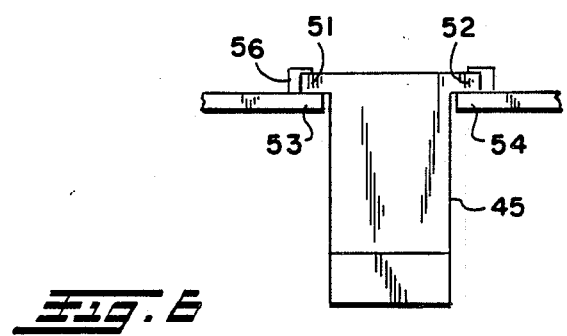
FIG. 6 is an end elevation schematically showing the support guides for the shiftable objective lens assembly in the preview optics.

As best shown in FIGS. 2, 5 and 6, this objective lens assembly or turret 44 has a body 45 with a first bore 46 and a second bore 47 passing therethrough. An objective lens 49 for a sixteen millimeter microfilm strip is mounted in first bore 46. An objective lens 50 for a 35 millimeter microfilm strip is mounted in second bore 47. The sixteen millimeter objective lens 49 and 35 millimeter objective lens 50 can be alternately slid into alignment with the preview scanning optical path depending upon the type of microfilm strip being driven through the system.

For this purpose, the lens body 45 has two outwardly extending shoulders 51 and 52 at its upper end. The bottom walls of these shoulders respectively slidingly ride along support rails 53 and 54. These rails have an elongated space therebetween to receive downwardly depending body 45. L-shape brackets 56 are mounted above guides 53 and 54 to receive the outer ends of shoulders 51 and 52 for horizontal and vertical stability and guidance during sliding movement.

Two spaced stops 57 and 57A may be provided on guide rails 53 and 54 to provide proper positioning of the objective lens assembly 44 relative to the center line 42A of the preview optics. As shown in FIG. 5, when the assembly body 45 abuts stop 57, the objective lens assembly 44 is positioned to align the 35 millimeter objective lens 50 with the center line 42A of the preview optics. When the objective lens assembly is slid along its tracks to have the body 45 abut stop 57A, the sixteen millimeter objective lens 49 is positioned along the center line 42A of the preview optics. The first light beam 42 emanating from either the objective lens 49 or objective lens 50 is sequentially reflected off mirrors 59 and 60 toward a sensor board, indicated generally at 61, and a preview screen 62.

As best shown in FIGS. 2, the center line 42A of the preview optics is directed toward an elongated linear array of photodiode sensors 64 mounted on one edge of the sensor board 61. These sensors are receiving the optical information carried by the first light beam 42 that has passed through and been focused on the microfilm images on the microfilm strip being transported through the system. Seventy-two sensors on 0.02 inch centers have been used for this array. Each sensor has 256 different levels of light intensity sensitivity. The light intensity level of each sensor during the preview scanning is sequentially measured and recorded in an analog to digital conversion in a microprocessor schematically indicated generally at 65. These individual sensors after normalization are continuously polled by the microprocessor to determine, for example, if an image edge is being sensed or if lines of print on the microfilm image are being sensed.

The optical image information sensed and converted by sensor board 61 and microprocessor 65 includes the location data for all four side edges of the microfilm image and for the synchronization mark position thereof and further includes the background density data for the image being scanned. This microfilm image data sensed and converted is temporarily recorded in microprocessor 65 electronically coupled to the sensor board 61. The edge, synchronization mark and background density data temporarily recorded in the preview scanning optics is then used to control the operation of the printing optics 33. The printing optics 33 are positioned a fixed distance downstream from the preview optics 32. The spacing therebetween has been selected in the preferred embodiment to be one and three-quarter inches, which is long enough to make sure that even the largest microfilm images are fully scanned before being printed while being short enough to provide size and structural efficiencies.

Figure 4:
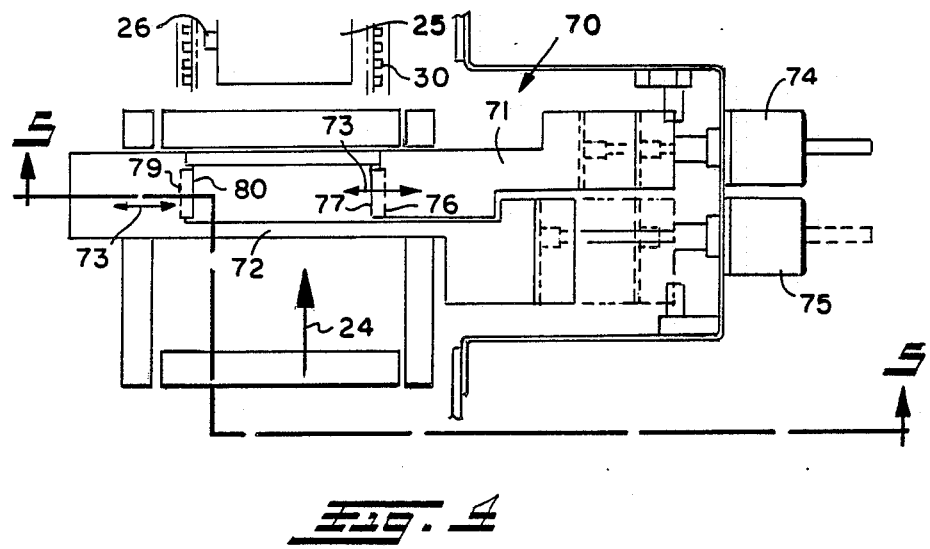
FIG. 4 is a plan view principally of the high speed mask assembly used in the printing optics of the present invention.

The printing optics 33 include a second, vertically adjustable light source 67 emitting a second light beam traveling through the printing optics in a second light path, indicated generally at 68. The centerline of the printing optics is indicated at 68A, while the used portion of the optical cone of the second light beam is indicated at 68B. The second light beam passes through a condensing lens 69, operative to focus the second light beam on the microfilm image aligned therewith. The condensing lens 69 is selectively received in a rack 69A having a plurality of vertically spaced support brackets. The proper focal length condensing lens and vertical position within rack 69A must be selected for the microfilm strip images being printed. The light beam leaving condensing lens 69 sequentially passes through a masking assembly, indicated generally at 70, and the microfilm strip 12. The masking assembly 70 is best shown in FIG. 4.

The masking assembly includes a first mask 71 and a second mask 72. These two masks are respectively driven toward and away from one another as indicated by the arrows 73 by high speed stepper motors 74 and 75. The terminal end of first edge mask 71 is downwardly bent at 76 to position its edge 77 as closely adjacent the passing microfilm strip as possible. The opposing portion of second mask 72 is bent at 79 to position its edge 80 as closely adjacent the passing microfilm strip as possible. The relative spacing between edge 77 of first mask 71 and edge 80 of second mask 72 is controlled in accordance with the edge location data temporarily recorded by the preview optics for the side edges 81 and 82 of the microfilm image 25 shown in FIG. 3. The spacing between mask edges 77 and 80 may be automatically varied during printing to accommodate differences in the widths of succeeding microfilm images in accordance with the edge location data previously temporarily recorded in the preview optics.

The second light beam 68 emanating from the microfilm image passes through a second objective lens 84. The focal length of the objective lens 84 must be selected for the microfilm strip being printed, and different objective lens may be interchanged and installed in the printing optics in accordance with that selection process, as described in more detail below. The second light beam passing through second objective lens 84 is reflected off mirror 85 to a pair of zoom mirrors 86. The zoom mirrors are simultaneously adjustable to reposition the same for the magnification required to enlarge from the microfilm image size being printed to the desired print or copy size. The zoom mirrors 86 are driven as a pair by a high speed stepper motor between the respective magnification positions required, as exemplified in phantom at 86A. The second light beam 68 is sequentially reflected off the pair of zoom mirrors 86 toward a shutter assembly, indicated generally at 87.

The shutter assembly 87 includes a shutter 88 secured to a shaft 89 rotatably mounted on a frame assembly 90. The shaft is selectively rotatably driven in either direction by a rotary solenoid motor 92 mounted on frame 90. The shutter may be driven by solenoid motor 92 between a closed position, indicated in full lines in FIG. 2, and an open position indicated in phantom lines at 88A. When the shutter is in its closed position, the optical path of second light beam 42 is blocked for edge masking functions. When the shutter is in its open position 88A, the optical path of second light beam 68 passes through the shutter assembly 87 toward a mirror 94.

The light beam is reflected off mirror 94 and directed toward a photoconductive reproduction drum 95. The optical path for second light beam 68 between mirror 94 and drum 95 passes through an aperture control device indicated generally at 96.

The aperture control device 96 includes two parallel rods 97 and 98 rotatably mounted to a frame assembly 99. A gear 100 is secured to the parallel rods 97 and 98 for rotation therewith. An endless drive belt 102 is trained around gear 100 and drive gear 103 of stepper motor 104. Stepper motor 104 through the belt and gear drive train is operative selectively to rotate parallel rods 97 and 98. Depending upon the degree of rotation of the rods relative to the optical path passing therethrough, the effective size of the aperture defined therebetween can be enlarged or decreased. By enlarging the aperture size, the light exposure on the photoconductive drum 95 is increased and vice versa. The position of the parallel rods 97 and 98 during printing of a given microfilm image is controlled to provide drum light exposure correlated to the background density data temporarily previously recorded for that microfilm image by the preview optics. The stepper motor 104 is electronically coupled to the microprocessor 65 for this control function.

The microfilm image thus exposed as a latent image on the photoconductive drum 95 is substantially the size of the plain paper being printed. This latent image is transferred to the paper traveling along paper feed path 105 toward delivery bin 8. The photoconductive drum reproduction technique is conventional except that the charges on the drum and toner are opposite to the conventional reproduction system because microfilm has dark background and clear characters instead of the reverse.

In the operation of the roll microfilm printing system unit 1, the microfilm strip 12 is initially threaded onto the microfilm transport system between reels 11 and 18, and the objective lens assembly 44 is shifted to position he proper lens in alignment with the preview optics for the microfilm strip to be scanned and printed. The optical light sensors 64 are also normalized relative to one another to provide consistent levels of light intensity sensitivity across the entire sensor array.

Tension is then applied to the strip 12 by tensioning rollers 13 and 17, which automatically respectively move to positions along slots 20 and 21 to apply the preselected tension. When the tension is applied, the preview optics light 41 automatically comes on to illuminate preview screen 62. The pilot screen 106 can also be illuminated by turning on the printing optics light source 67. The operator initially observes the images on preview screen 62 and pilot screen 106 to set up the unit and program the microprocessor for the preview and printing functions.

Relative to the pilot screen 106, the used portion 68B of the optical cone of light beam 68 is reflected off mirror 85, zoom mirrors 86, pilot mirror 107 to the pilot screen 106. A magnified or macroimage of the microfilm image on the microfilm strip 12 in alignment with the printing optics 33 is displayed on the pilot screen. This macroimage on the pilot screen is used for two initial purposes.

First, lenses 69 and 84 may be adjusted based upon the image observed in pilot screen 106 to bring the printing optics 33 into focus for the specific microfilm strip being printed. Second, the wall 3 may be adjusted in the Y direction relative to console 2 to bring the path of the microfilm images on the microfilm strip into alignment with the paper feed path.

For this purpose, all of the microfilm drive structure is mounted on the wall 3, the sensor board and preview screen are mounted on wall 3 and the light source and lenses for the preview optics are mounted on the movable wall 3. By observing the position of the microfilm images in pilot screen 106, the vertical wall 3 can be adjusted until those images are aligned with the paper feed path, as identified by the indicia scale 107 on the frame of the pilot screen. Since the paper feed path is dimensionally fixed relative to the console, the paper feed path indicia scale 107 for different size papers can be fixed along the pilot screen frame, rigidly attached to the console 2. That indicia scale correlates the actual paper feed path to the microfilm strip feed path by vertical wall 3 being adjusted in the Y direction until there is visual alignment between the edges of the microfilm image having a known desired print size on the feed path and the corresponding paper size numbers on the scale. When this alignment has been obtained, the reproduced microfilm image will be properly positioned on the resultant copy.

Relative to setting up the preview optics for the microfilm strip being printed, a tutorial program is provided with the tutorial messages being given in a display indicated generally at 110. The tutorial screens are set forth below in their display sequence.

---

1. SET UP: ENTER 0
   PRESET: ENTER #1-9
2. SET UP: START-ENTER 0
   STORE-ENTER #1-9
2A. ARE YOU SURE?
   ENTER 1=YES, 0=NO
3. SET UP: ENTER LENS
   FOCAL LENGTH
4. SET UP: ENTER SYNC
   0=MRK, 1=SKT, 2=EDGE
4A. SET UP: ENTER (2-16)
   SPROCKET COUNT
4B. SET UP: ENTER BLIP
   0=CLEAR, 1=OPAQUE
5. SET UP: ENTER LOWER
   LMT SYNC CHANNEL
6. SET UP: ENTER UPPER
   LMT SYNC CHANNEL
7. SET UP: ENTER LOWER
   LMT IMAGE CHANNEL
8. SET UP: ENTER UPPER
   LMT IMAGE CHANNEL
9. SET UP: ADVANCE SYNC
   EDGE TO PREVIEW REF.
10. SET UP: ADVANCE IMAGE
    EDGE TO PILOT REF.
11. READY TO PRINT

---

Relative to the first screen in the tutorial, the operator is asked to enter whether it is a new set up or a preset program which has been stored in the microprocessor. If it is a new set up, the operator enters 0 to bring up screen 2. If it is a preset program, the operator enters the storage location in the machine, for example location 6. The printing system would then be in a ready to print mode, and the tutorial display would skip to screen 11.

In a new set up relative to screen 2, the operator enters 0 to indicate the set up start which will advance to screen 3. Alternately, the operator can also indicate whether the current set up should be stored and, if so, where. This choice advances the tutorial to screen 2A.

Relative to screen 2A, the operator is given a chance to reevaluate whether to store the current program and to make sure that the previous program in that position can be erased. If the operator is sure, he enters the numeral 1 corresponding to a "yes" indication to advance to screen 11.

Screen 3 elicits the lens focal length being used in the system for the particular microfilm strip being printed. This lens length is calculated by initially determining the magnification ratio needed by measuring the microfilm image height and comparing the same to the paper height being printed. The magnification ratio thus computed is entered into the microprocessor and is used by the operator to determine printing optics set up from a chart provided with the printing system. This chart indicates the proper vertical position of second light 67 relative to the microfilm, indicates the condensing lens to be used and its position in the condensing lens rack and indicates the objective lens 84 to be used. Thereafter, the operator adjusts the second light 67, positions the condensing lens 69 in its proper position in the condensing lens rack and screws in the proper objective lens 84. The focal length of the lens system being used is then entered into the microprocessor and the print button pushed to bring up tutorial screen 4.

Relative to screen 4, the operator is entering the synchronization method being used to correlate the paper feed to the microfilm strip feed for the specific microfilm strip being printed. If synchronization marks 26 are being used for synchronization, the operator enters 0. If sprocket holes are being used, the operator enters 1. If the leading edges are being used, the operator enters 2. After making the appropriate entry, the operator pushes the print button to bring up screen 4A, if sprockets are used for synchronization, screen 4B, if synchronization marks are being used for synchronization, and screen 5, if the leading edges are being used for synchronization.

Relative to screen 4A, the operator is asked to enter the number of sprocket holes from the leading edge of one image to the leading edge of the next image. This number of sprocket holes is then entered into the microprocessor and the print button pushed to bring screen 5 up.

If synchronization marks are being used, the operator is provided with tutorial screen 4B. The operator looks at the microfilm strip to determine if the synchronization marks are clear or opaque. If opaque as shown in FIG. 3, the operator would then enter 1 and press the print button to bring up screen 5. If transparent, the operator would enter 1 and press the print button to bring up screen 5.

Relative to screen 5, the operator is being asked to determine the lowest numbered sensor in the sensor array aligned with the outer edge of the synchronization format being used. For this purpose, on indicia strip 111 numbered from 1 through 72 is placed on the frame of preview screen 62 adjacent to and in alignment with the seventy-two sensors 64, which are visually observable in preview screen 62 as illustrated in FIG. 3. For example, if synchronization marks are being used for synchronization as shown in FIG. 3, the number 3 for sensor 3 would be entered since it is in alignment with the outer edge of the synchronization mark 26. The print button would then be pushed to bring up screen 6.

Relative to screen 6, the operator is entering the number of the sensor that is most closely aligned with the edge of the synchronization means closest to the microfilm image. As illustrated in FIG. 3, sensor 5 is best aligned with this edge of the synchronization mark, and thus the number 5 would be entered into the microprocessor. The print button would then be pressed to bring up screen 7.

Relative to screen 7, the operator is entering the number of the lowest numbered sensor in alignment with the edge 82 of the microfilm image. As shown in FIG. 3, sensor 5 would be in this position, and the number 5 would thus be entered by the operator. The print button would be pressed to bring up the screen 8.

On screen 8, the operator is asked to determine the highest numbered sensor aligned with the other edge 81 of the microfilm image 25. As shown in FIG. 3, sensor 68 would be in this position and thus the number 68 would be entered by the operator. The print button would be actuated to bring up the screen 9.

The sensor numbers keyed into the microprocessor in response to screens 7 and 8 initially automatically set the first and second masks to that spatial position relative to one another to mask those images to edges 81 and 82 to block unused microfilm strip from the printing optics 33. The relative spacing between the first and second masks may be automatically varied during printing to accommodate a differently sized microfilm image, with that change in spacing being controlled by the edge data temporarily previously recorded in the preview optics.

In screen 9, the operator is entering the address of the leading edge of the synchronization mark at the preview screen. For this purpose, the front edge of the synchronization mark is advanced to the edge of the preview screen adjacent the numbered indicia 111. The print button is then actuated and the address of the leading edge of the synchronization mark in the preview screen is automatically recorded in the microprocessor.

Screen 10 is then displayed to allow the operator automatically to enter the address of the leading edge of the next succeeding image after that synchronization mark, when that image reaches the printing optics. For this purpose, the microfilm strip is advanced with the film control knob 113 in the printing drive mode until the leading edge 27 of that image has been advanced the required distance between the preview optics and printing optics to position that leading edge against the edge of the pilot screen 106 having the indicia scale 107 thereon. When this leading edge has been thus aligned, the print button is pushed and the address of that leading edge at the printing optics is automatically entered into the microprocessor. The addresses entered for the leading edge of the synchronization mark in the preview screen and for the leading edge of the subsequent image at the pilot screen are directly related to the microfilm drive motor encoder count. Thus, the film position can be related to the paper feed sequence and position through a conventional motor encoder.

After the print button is pressed to enter the leading edge address in the printing optics, screen 11 indicates that the printer system unit has been fully programmed and is ready to print. Actuation of the print button at that time results in the microfilm being driven from reel 11 through the preview and printing optics to reel 18.

In this operation, the preview optics 32 are scanning each microfilm image as it passes. The sensor board 61 is sensing the optical information carried by the light beam 42 that has passed through the microfilm images.

The edge location data for the synchronization format and for the microfilm image are interpreted and temporarily recorded by sensor board 61, microprocessor 65 and associated electronic circuitry. This temporarily recorded edge location and background density data is used to control the printing optics. In this regard, the data temporarily recorded relates to images passing through the the preview optics that must travel to the printing optics before the printing sequence for the image is initiated.

In the printing optics, the shutter 88 is closed between microfilm images to provide a masking function. When the leading edge of the microfilm image to be printed is intersected by the second light beam 68 of the printing optics, the microprocessor 65 operates to open shutter 88 to its position 88A to allow the second light beam to pass through the shutter assembly and ultimately be directed to drum 95. The edge masks 71 and 72 have been automatically positioned during the set up programming to mask edges 81 and 82 of the microfilm images. The parallel rods 97 and 98 have also been automatically positioned by the microprocessor relative to the light beam passing therethrough to provide the proper drum exposure for the image being printed in accordance with the background density data previously recorded for that microfilm image during scanning in the preview optics. When the second light beam 68 of the printing optics intersects the trailing edge of the microfilm image being driven therepast, shutter 88 is automatically moved to its closed position to mask the other edge thereof in accordance with the edge data recorded during prior scanning in the preview optics.

As the microfilm strip advances through the printing optics, the microprocessor is preparing the printing optics for printing the next microfilm image in accordance with the data temporarily recorded in the scanning in the preview optics. Assuming the next microfilm image encountered has a smaller size than the previous microfilm image, the microprocessor during traversal between images would automatically adjust masks 71 and 72 to eliminate unused microfilm frame image area, would adjust the aperture control device for proper exposure control based upon the prerecorded data, would control the shutter sequence as required and would activate the paper feed system to draw properly sized paper from the right supply bin for the image then being printed. When the microfilm strip has been entirely printed, the plain paper copy are in the delivery bin in proper numerical sequence.

The shutter 88 and edge masks 71 and 72 thus cooperatively mask the edges of the microfilm edge in alignment with the printing optics to block unused microfilm strip from those printing optics. By this image masking procedure, the unwanted black border is eliminated from or minimized on the resulting copy, and the toner consumption is decreased. The copy quality is thus improved. Moreover, the cost of raw materials is reduced, while the printing unit may experience less service and maintenance because less toner is being used in the system.

It will be apparent from the foregoing that changes may be made in the details of construction and configuration without department from the spirit of the invention as defined in the following claims.

What is claimed:

1. A roll microfilm printer comprising:
   a first reel having microfilm strip rolled thereon, the microfilm strip containing microfilm images;
   a second reel;
   means to drive the microfilm strip under tension from the first reel sequentially through preview optics and printing optics to the second reel, the preview optics and printing optics having different optical paths,
   the preview optics being operative to scan the images on the microfilm passing therethrough to sense and temporarily record information about each microfilm image; and
   the printing optics being operative to automatically control at least one printing function in accordance with the temporarily recorded edge location data while the microfilm image passing therethrough is being printed onto plain paper.

2. The roll microfilm printer of claim 1 wherein the preview optics includes a first light beam sequentially passing through each microfilm image on the microfilm strip and a sensor board in the optical path of such first light beam.

3. The roll microfilm printer of claim 2 wherein the sensor board includes an array of photo diode sensors receiving the first light beam optically to sense edge location data, image background density data and microfilm synchronization mark data for each microfilm image scanned by the preview optics, the sensed data temporarily being recorded in a microprocessor.

4. The roll microfilm printer of claim 3 wherein the preview optics includes an adjustable lens assembly, the lens assembly including a first magnification lens for 16 mm microfilm and a second magnification lens for 35 mm microfilm, the first and second magnification lens being alternately shifted into and out of the first light beam depending what size microfilm strip is being printed.

5. The roll microfilm printer of claim 3 wherein the printing optics include a second light beam having an optical path passing through the microfilm images to a photoconductive drum for optically transferring the microfilm images in magnified form onto the photoconductive drum for subsequent printing onto plain paper.

6. The roll microfilm printer of claim 5 wherein the printing optics further include an edge masking assembly and a shutter cooperatively masking the microfilm image during printing to eliminate unused microfilm image area on the print, the edge masking assembly and shutter being controlled by the microprocessor in accordance with the edge location data temporarily recorded for each microfilm image being printed.

7. The roll microfilm printer of claim 6 wherein the edge masking assembly is positioned immediately adjacent the microfilm path in alignment with the printing optics, the edge masking assembly including a first and second mask selectively adapted to move toward and away from one another, with the space therebetween essentially corresponding to the length of the microfilm image being printed between its top and bottom edges.

8. The roll microfilm printer of claim 7 wherein the edge masking assembly includes first and second high speed stepper motors respectively to drive the first and second masks, the first and second high speed stepper motors being controlled by the microprocessor in accordance with the edge location data recorded through the preview optics.

9. The roll microfilm printer of claim 8 wherein the shutter is moved between a closed position and an open position by a high speed rotator controlled by the microprocessor, the shutter in its closed position blocking the second light beam for masking between the microfilm images being printed and the shutter in its open position allowing the second light beam to be transmitted to the photoconductive drum for printing.

10. The roll microfilm printer of claim 5 or claim 9 wherein the printing optics further includes an exposure control device having a variable size aperture positioned along the optical path of the second light beam, the size of the aperture being controlled by the microprocessor to regulate drum exposure for the microfilm image being printed in accordance with background density data therefor recorded during initial scanning by the preview optics.

11. The roll microfilm printer of claim 1 wherein the microfilm strip sequentially passing through the preview optics and printing optics is controlled by first and second gates, each gate including two pairs of rollers operating to flatten the microfilm strip passing through the optics and to slightly bend the microfilm strip just before and just after the optics.

12. The roll microfilm printer of claim 1 wherein the preview optics include a first light source and first lens means and the printing optics include a second light source, second lens means and edge masking means, with the microfilm being threaded through gate means to flatten the microfilm images for scanning and printing.

13. The roll microfilm printer of claim 12 wherein the supply reel, takeup reel, gate means, first light source, first lens means and edge masking means are mounted on a movable vertical wall relative to a console housing the paper feed path, the position of the wall being adjustable to center the printed microfilm image on the paper copy.

14. The roll microfilm printer of claim 13 wherein the preview optics includes a preview screen mounted to the movable vertical wall to view an enlarged image of the microfilm strip at the preview optics and the printing optics includes a pilot screen mounted to the console to view an enlarged image of the microfilm strip at the printing optics, the preview and pilot screens being used to set up and program the printer.

15. The roll microfilm printer of claim 14 wherein the preview screen has a sensor position indicia scale associated therewith for correlating specific sensors to specific preview scanning functions and the pilot screen has a paper feed path indicia scale associated therewith to correlate the microfilm strip feed path to the paper feed path.

16. A method for printing images contained on rolled microfilm strip onto plain paper comprising the steps of:
continuously passing the microfilm strip through preview optics and printing optics having different optical paths;
sequentially scanning the continuously moving images with a first light beam in the preview optics to sense and temporarily record information data for each image;
printing the continuously moving microfilm images onto plain paper using a second light beam in the printing optics; and
controlling at least one printing function in the printing optics using the prerecorded edge information data.

17. The method of claim 16 comprising the further steps of:
controlling masking of the microfilm images and light exposure onto a photoconductive drum in the printing optics in accordance with the prerecorded background density data for that image in the preview optics.

18. The method of claim 17 comprising the further step of using a preview screen on the preview optics and a pilot screen on the printing optics to set up and program the scanning, printing, masking and exposure control steps.

* * * * *